Figure 1:
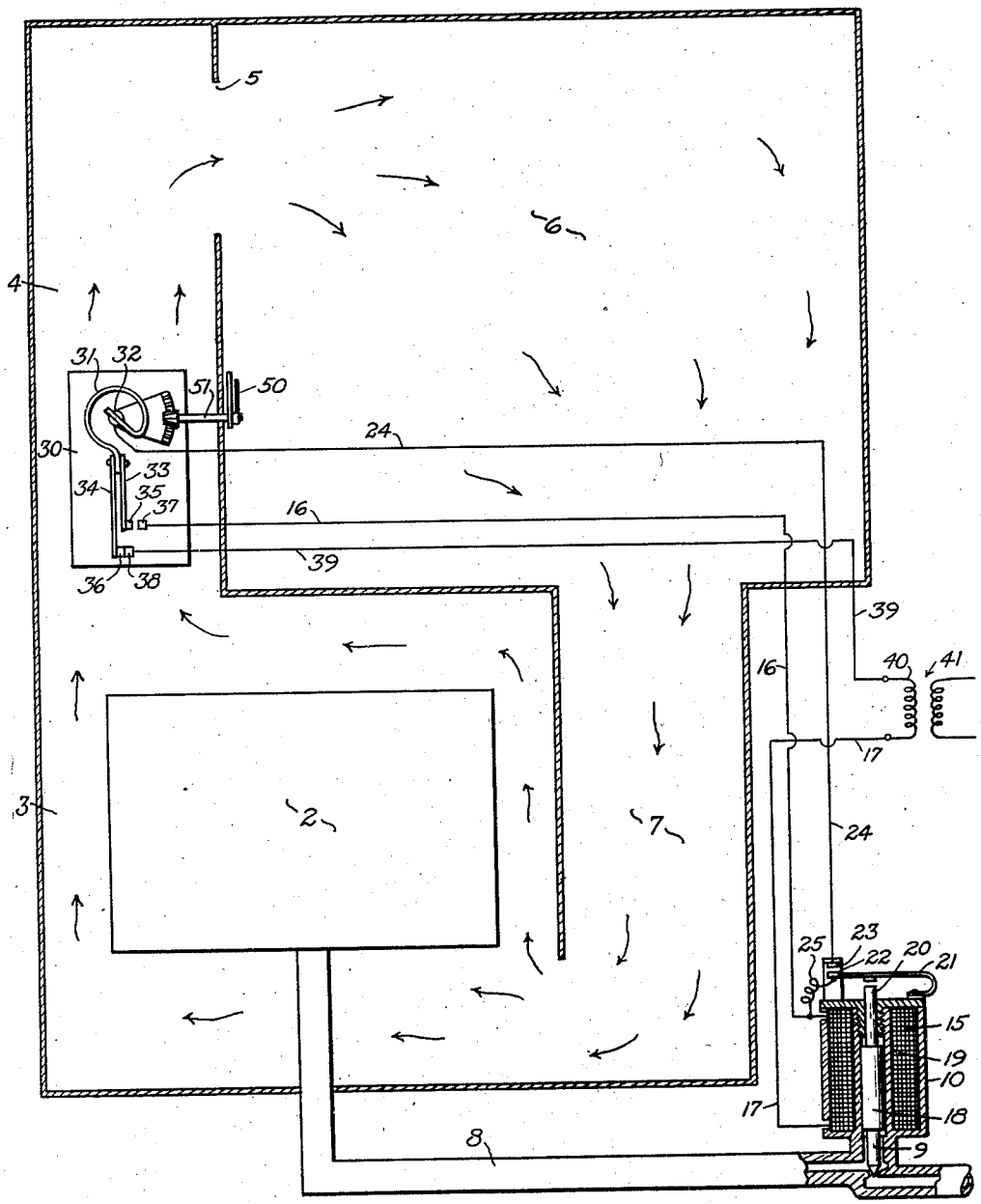

Oct. 15, 1946.  W. W. MUIR  2,409,305
HEAT CONTROL
Filed May 22, 1943   2 Sheets-Sheet 1

W. W. Muir
Inventor
by
Attorney

W. W. Muir
Inventor

Patented Oct. 15, 1946

2,409,305

UNITED STATES PATENT OFFICE 2,409,305

HEAT CONTROL

Wellington W. Muir, Lockport, N. Y.

Application May 22, 1943, Serial No. 488,082

2 Claims. (Cl. 236—10)

This invention has to do with the maintenance of the temperature in a room or other space at what may be termed a constant temperature regardless of the temperature outside or surrounding such space, it being understood of course that in the case of a building the walls thereof will be properly insulated in accordance with the geographic location of the building relative climate. By constant temperature is meant the maintenance of the room temperature within a very small differential, such differential being as little as $\frac{1}{32}$ of a degree, and therefore this invention is not to be confused with heretofore known temperature controls wherein the temperature differential has been of the order of two degrees and such as is the common practice today in probably 90% of all heating installations. Further, the constant temperature according to this invention can be made as desired, but in the following disclosure it will be assumed to be 76° F. for exemplification purposes only.

It has been ascertained by many heating engineers that a constant temperature is desirable but, so far as is known, no real constant temperature control has been provided except as above stated to the 2° differential, and this 2° differential has always resulted in what the engineers term the "cold 70" in the operation of the heating mechanism because while the differential of the actual thermostat in the room has been perfected to the minimum differential of two degrees, yet it is a fact that the temperaure of the air in the room has a differential of at least six degrees and oftentimes more, comprising a minimum of two degrees below and two degrees above the thermostat differential. These additional temperature ranges, over the thermostat differential of two degrees, are occasioned by the fact that the room thermostat does not accurately control the heating medium (air, steam or water), or in other words when the room thermostat moves to break the electric control of the burner, the thermal units in the heating fluid continue to flow due to the inertia of the stream of heating fluid, so that these thermal units continue to be injected into the room and hence raise the temperature of the air in the room a few degrees above the maximum setting of the thermostatic control; and reversely when the room thermostat moves to close the electric control of the burner, there is a lapse of time for the thermal units of the heating fluid in travelling from the burner to the room to become effective therein, and hence the actual temperature of the air in the room falls two or more degrees below the minimum setting of the thermostatic control before such thermal units operate to raise the air temperature.

Also, it has been ascertained that the human body is sensitive to temperature changes, or in other words, a person becomes readily aware of a change in temperature, whereas if the temperature of a room can be maintained constant, the human body in that room is more comfortable than in the case where the room temperature changes, regardless of the actual degree of that constant temperature, within reason of course. That is to say, the constant temperature may be 80 degrees, or seventy degrees, or a temperature different from these, but so long as it is maintained constant, the human body feels no discomforture and therefore it is undoubtedly true that the discomforture usually felt by a person in a fluctuating room temperature is due to the alternate lowering and raising of the temperature of the surface of the skin and its effect upon the nervous system, and particularly is the human system susceptible to a lowering of temperature, even to a small degree. Therefore if the temperature of the skin can be maintained constant, there will be no discomfort.

This invention is particularly directed to a heating system wherein the fluid used as a heating medium is air, and such air is maintained in circulation from the burner to the room and then back to the burner. The invention is well adapted to the use of such fluid medium because the air moves relatively fast as compared to water the circulation of which is occasioned only by convection. Also a hot air system lends itself particularly to this invention because the heating medium is the same as the medium in the room, mixing freely therewith, and throughout the room, and not being confined to extremely narrow limitations or paths of travel as is the case in water and steam heating systems; in other words, the heated air from the burner is free to quickly diffuse into, and to expand in, the air of the room to affect the temperature of the room far more quickly than in the case of radiation of heat thermal units in a water or steam system.

From many tests it has been ascertained that in the operation of an automatically controlled heating system where the thermostat is located as in common practice on the wall of a room substantially at the center of the house, there has been a temperature differential of approximately thirty-two degrees in the hot air pipe leading from the furnace during a cycle of the furnace operation, or between the on and off of the thermostatic control, and this thirty-two degree differential remains substantially constant regardless of outdoor temperature. This means that the temperature of the heating medium (air) must rise thirty-two degrees in the hot air pipe before the room thermostat trips to stop the burner. As above stated, the usual thermostat has been refined to a point where it will operate on a two degree differential of room air temperature and consequently it will be seen that it takes thirty-two degrees rise or fall of heat in the hot air pipe to effect a two degree change in room temperature. Therefore it will be seen that if this differential between the rise and fall of the hot air pipe temperature can be reduced, there would result a substantially constant room temperature. Therefore applicant moved his room thermostat to a position in the hot air pipe, said thermostat having the two degree differential, and found by many tests that he had reduced his room temperature to one which was constant during the cycle of operation of the heating system as measured by temperature instruments now on the market. Actually there probably would not be an absolute constant temperature in the room, but any differential in such temperature would be so infinitesimally small as to be practically unmeasurable by instruments and certainly not physically apparent to the human body. This result was surprising and consequently many tests and checks were made to be sure of this result, and all of such tests proved conclusively that this result was actual.

In order that the invention may be clearly understood reference is made to the accompanying drawings in which like numerals designate like parts in all the views, and according to which—

Figure 2:
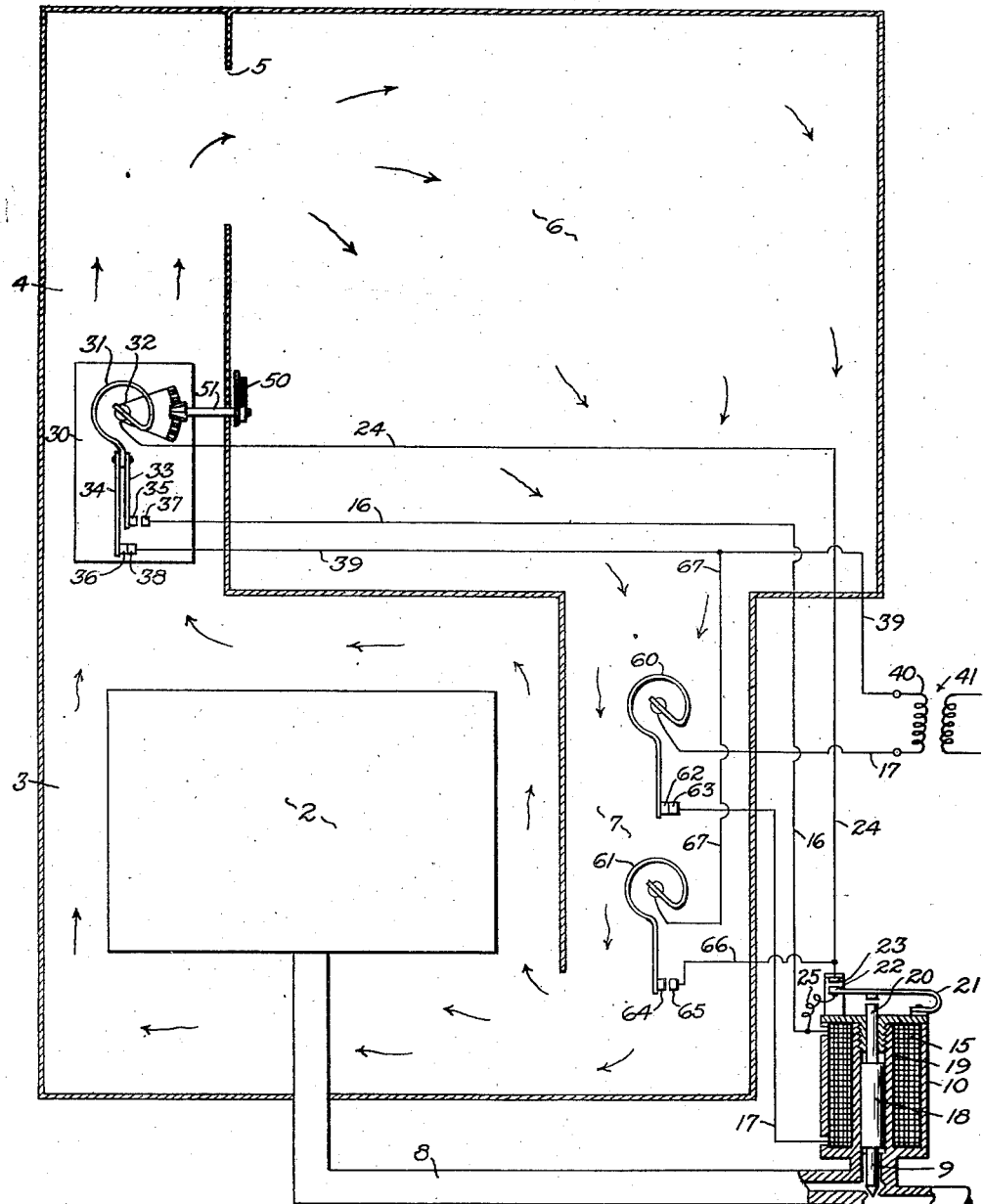

Fig. 1 is a diagrammatic illustration of the thermostatic control according to this invention; and Fig. 2 illustrates a modification of a portion of the control illustrated in Fig. 1.

In Fig. 1 the burner or furnace is indicated at 2 provided with the usual air jacket 3 from the top of which leads the hot air delivery pipe 4 for discharge of the heating medium through the opening 5 into the room 6, the return of the heating medium being by way of the return duct 7 to the lower part of said heating jacket; the flow of the air is indicated by the arrows. From the furnace there leads the pipe 8 through which fuel is supplied to the furnace, and in said conduit there is provided a valve 9 preferably actuated by the electromagnet or solenoid generally identified by the numeral 10 for opening and closing said valve. This valve control may be of any suitable type, but in the drawings it comprises a coil 15 one end of which is connected to a wire 16 and the other end of which is connected to another wire 17, the valve 9 comprising a stem having an enlarged portion 18 slidable within a cylindrical core member 19 and having at its upper end an extension 20 of smaller diameter and extending out of the electromagnet for contact with a spring 21 one end of which is rigidly secured to the casing of the electromagnet and the other end of which comprises a contact 22 engageable with a companion contact 23 insulatedly mounted upon the casing of the electromagnet but connected electrically with the wire 24, said contacts 22 and 23 being moved into closed position when the core 18 of the electromagnet or solenoid is raised through energization of the coil 15, the tension of the spring 21 normally tending to keep said contacts open. The contact 22 is connected by the wire 25 to the wire 16.

Any suitable thermostatic device may be employed such as that diagramatically illustrated in Fig. 1 and generally identified by the numeral 30 and located within the hot air delivery pipe 4 or possibly within the upper portion of the jacket 3. The thermostat shown comprises a bi-metallic arcuate member 31 one end of which is rigidly supported as at 32 but the other end of which is provided with two flexible members or blades 33 and 34 the extremities of which comprise the respective contacts 35 and 36, which contacts are engageable and disengageable with the companion stationary contacts 37 and 38 respectively, the contact 37 being joined to the wire 16, and the contact 38 being joined to the wire 39 connected to one end of the secondary 40 of an AC transformer generally identified by the numeral 41, the other end of the secondary being connected to the wire 17. The wire 24 heretofore described has its other end connected to any suitable portion of the bi-metal member of the thermostat. Whereas in the drawings there is illustrated a thermostat 31 as one specific example of a means for carrying out this invention, it is to be understood that the location of this thermostat may be as shown or at any point intermediate the furnace 2 and the air discharge 5 into the room and, further, appropriate means other than the thermostat illustrated may be utilized for such control of temperature and comprising even a thermocouple built into or attached to the wall of the furnace.

The operation of the system should be clear from this description of mechanical parts particularly in view of the fact that standard equipment may be used as previously stated, but a brief statement of the operation follows: As the temperature falls in the system the bi-metal member of the thermostat will contract to move the blade 34 to the right as seen in Fig. 1 to close the contacts 36—38, but no electric current will flow because the circuit is open at both the contacts 35—37 and 22—23. Upon continued fall of temperature, the blade 34 flexes more, tightening the engagement of contacts 36—38 and ultimately causing the other blade 33 to move its contact 35 up to the stationary contact 37 and when this occurs there is a closing of the electric circuit to energize the coil 15, moving the solenoid core 18 upwardly and opening the valve 9, but in this upward movement of said core the spring 21 will be flexed to close the contacts 22—23 and also permit current to flow over the wire 24, and the circuit including this wire 24 remains closed until the contacts 36—38 separate. However, the contacts 35—37 are in what is known as a "trigger" circuit and really never are closed except at the initial operation of the system, because after the system becomes operative these contacts come together only instantaneously because of the small differential in temperature in the hot air pipe 4 and/or the lack of inertia in the heating medium. The valve 9 remains open until the temperature in the hot air pipe 4 rises to a degree causing expansion of the bi-metal member 31 and opening of the contacts 36—38, thereby deenergizing coil 15 and causing the solenoid core 18 to drop under the influence of gravity to close valve 9. When the temperature in the hot air pipe 4 again falls, there will be a repetition of the action just above described.

In such operation it will be understood that the temperature of the room will be desired maintained at 76° F. and experiments showed that to do so at an outdoor mean temperature of 25° F. it was necessary to have the thermostat in the hot air pipe set to start the burner at 113° F. and to stop the burner at 115° F. temperature of the air in the hot air pipe. When the outdoor temperature changed above or below the mean temperature of 25° F. the same thermostat setting would give a comfortable but not necessarily constant room temperature, but the time of operation of the burner would change so that the burner would remain on longer with the decrease of the outdoor temperature, and would remain on for a shorter time with the increase in outdoor temperature. It was found that with a range of outdoor temperature change from 12° below zero to 65° above (total 77°) there was a differential or change in room temperature of approximately eight degrees. In other words it was found that each 10° change in outdoor temperature effected a 1° change in the room temperature, above and/or below said outdoor mean temperature, but due to the normal or usual wall insulation the rate of change in the room temperature was not so fast as the rate of change in the outdoor temperature. Therefore, even with a rapid lowering or raising of the outdoor temperature, the wall insulation cut down the rapdity of heat loss from the room so as to give sufficient time for the burner to generate and deliver heat units to render the room comfortble, so that the lowering (or raising) of the room temperature was so gradual that it was not too apparent or discomforting to the human body. However, it is desirable to do away with such eight degree range of room temperature, to produce a constant room temperature, and hence means were developed to make this possible, all as will be described later.

It may be desirable to have means for varying the tension or setting of the bi-metal member of the thermostat in order to take care of, to a finer degree, the room temperature throughout the entire heating season, although it is desired understood that tests have shown that no such auxiliary adjustment is absolutely necessary. That is to say, in an average residence with a thermostatic control disposed as herein contemplated, it has been found that throughout the heating season there will be a constant room temperature in any cycle of operation although such constant temperature during one day might vary slightly from the constant temperature of another day, but such variances have been extremely small and the tests show that such variance is of the order of one degree for each ten degrees differential in outside temperature. Also, as hereinbefore stated, the constant temperature within the room need not be the same on all days of the operation of the system, since it has been ascertained that the constant temperature of one day may vary from the constant temperature of another day as much as from seventy degrees to eighty degrees without discomforture to the human body, provided that the temperature in any one day be constant; in other words for human comfort the room temperature should be constant throughout all the hours of any one day but that constant temperature might be different from the constant temperature of the next day.

Therefore there is contemplated the provision of manual or other means for changing the adjustment or setting of the bi-metal member of the thermostat in order to take care of relatively wide ranges of temperature changes as experienced in the heating season. Such a means is diagrammatically illustrated in Fig. 1 as comprising a handle indicator 50 within the room and mounted upon one end of a shaft 51 passing into the duct 4, the other end of which shaft is adapted to change the tension on the bi-metal member 31, and in this illustration such change is brought about by rack and pinion (or cam) movement of the fixed end of said bi-metal member, or their mechanical equivalents. Preferably a scale is provided in association with the handle indicator 50 and suitably marked as for example "Mild," "Cool," "Cold," and "Very cold," said handle indicator being manually turned to the proper legend on said scale in accordance with the outdoor temperatures, as will be readily understood, and merely as an example of one heating system it might be stated that the movement of such handle created a change of tension in such bi-metallic member to make the thermostat responsive to temperatures of approximately 90°, 100°, 115°, and 134° respectively for the scale markings just mentioned. The foregoing may be stated in other words as follows. In order to maintain substantially constant temperature, the amount of heat input should equal the amount of heat loss as through radiation, or there should be a practical balance of B. t. u. input and B. t. u. loss. This is accomplished by automatic thermostatic control of the heat source whereby the heat is "on" and "off" for different lengths of time for a given range of outdoor temperature, and this automatic control may be adjusted, governed, regulated, changed or varied by slight manual actuation of the handle 50 in order to meet an extreme (or different) range of outdoor temperature.

It might also be desirable to provide controls against accidental or unauthorized adjustments of the thermostatic device 30 and therefore there is contemplated herein the provision of controls whereby the room temperature may not exceed a certain predetermined increase in or lessening of the desired constant temperature, such a means being illustrated diagrammatically in Fig. 2 of the drawings. That is to say a constant room temperature of 76 degrees may be desired but, through some accident or mistake or unauthorized manipulation, the setting of the manual control shown in Fig. 1 may be moved to such a position that said constant room temperature would be increased or diminished so that an unbearably warm or unbearably cold condition would result in the room. To prevent this situation arising, there is provided in the return duct 7, two additional thermostatic devices generally identified by the numerals 60 and 61 of similar or different construction to that illustrated in Fig. 1, the thermostatic device 60 having the movable contact 62 and the stationary contact 63, and the other thermostat 61 having the movable contact 64 and the stationary contact 65, the stationary contact 65 being electrically connected as by the wire 66 to the wire 24 heretofore described, and the bi-metal member of thermostat 61 being electrically connected as by the wire 67 to the wire 39 heretofore described. The wire 17 heretofore described as leading directly from the secondary 40 of the transformer 41 to the coil 15 of the electromagnet or solenoid, has the thermostat 60 interposed therein, or in other words as illustrated in Fig. 2 one portion of the wire 17 leads from the secondary 40 to the bi-metal member of the thermostat 60, and the other portion of the wire 17 leads from coil 15 to the stationary contact 63 associated with said thermostat. The thermostat 60 for example may be pre-adjusted for a definite temperature such as 78 degrees, and the other thermostat 61 may be preadjusted for a definite temperature such as 74 degrees, where the room temperature of 76 degrees is desired, although it is to be understood that these preadjustments may be different in accordance with the particular installation and the wishes of the user of the system, the idea being solely to provide automatically a cut-off of the burner, and a starting of the burner, when the room temperature from any cause respectively exceeds or falls below the constant room temperature desired. Under normal and intended operation of the system with the thermostatic control 30, the thermostatic controls 60 and 61 might never have to operate but they are provided on the side of safety. Likewise, under normal conditions, it is to be understood that the contacts 62—63 of thermostat 60 will be closed whereas the contacts 64—65 of thermostat 61 will be open, and both of these thermostats are placed in more or less inaccessible positions on the side of safety, as in the air return duct 7 so that they may not be tampered with.

It is obvious that those skilled in the art may vary the details of construction and arrangements of parts constituting the apparatus, as well as vary the steps and combinations of steps constituting the method of this invention, without departing from the spirit thereof, and therefore it is desired not to be limited to the exact foregoing disclosure except as may be required by the claims.

What is claimed is:

1. In a hot air heating system including a space to be heated, a source of heat, a duct for supplying heated air from such source to said space, the discharge end of such duct terminating alongside a wall of said space, and a return conduit for conveying air from said space to such source, the combination of single thermostatic means for controlling the temperature of the air being conveyed to said space, said means disposed within said duct adjacent the discharge end thereof and separated from said space by the thickness of such such wall, a valved fuel supply pipe to such heat source, said thermostatic means controlling the admission of the fuel through the valve of said pipe, and means for adjusting the setting of said thermostatic means, said adjusting means comprising a member of a length only to extend through such wall to said thermostatic means, one end of said member being directly and operatively connected to an element of the thermostatic means, and the opposite end of said member being disposed in said space and having means for manual operation thereof, whereby the temperature in said space may be regulated to within a differential of one degree F.

2. In a hot air heating system including a space to be heated, a source of heat, a duct for supplying heated air from such source to said space, and a return conduit for conveying air from said space to such source, the combination of single thermostatic means for controlling the temperature of the air being conveyed to said space, said means disposed within said duct in close proximity to said space, a valved fuel supply pipe to such heat source, said thermostatic means controlling the admission of the fuel through the valve of said pipe, and means for adjusting the setting of said thermostatic means, said adjusting means comprising a shaft extending from said space through a wall of said duct to said thermostatic means, one end of said shaft having geared connection with an element of the thermostatic means, and the opposite end of said shaft being disposed in said space and having means for manual operation thereof, whereby the temperature in said space may be regulated to within a differential of one degree F.

WELLINGTON W. MUIR.